United States Patent
Bartley et al.

(10) Patent No.: US 7,667,487 B2
(45) Date of Patent: Feb. 23, 2010

(54) TECHNIQUES FOR PROVIDING SWITCHABLE DECOUPLING CAPACITORS FOR AN INTEGRATED CIRCUIT

(75) Inventors: Gerald K. Bartley, Rochester, MN (US); Darryl J. Becker, Rochester, MN (US); Paul E. Dahlen, Rochester, MN (US); Philip R. Germann, Oronoco, MN (US); Andrew B. Maki, Rochester, MN (US); Mark O. Maxson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 11/971,966

(22) Filed: Jan. 10, 2008

(65) Prior Publication Data

US 2009/0179669 A1    Jul. 16, 2009

(51) Int. Cl.
*H03K 19/173* (2006.01)
(52) U.S. Cl. .......................... 326/38; 327/594; 327/337
(58) Field of Classification Search .................. 326/38, 326/101, 41; 307/109; 327/379, 337, 594
See application file for complete search history.

(56) References Cited

U.S. PATENT DOCUMENTS

| 6,967,416 B2 * | 11/2005 | Clevenger et al. ........... 307/117 |
| 2007/0138653 A1 * | 6/2007 | Bartley et al. ............... 257/786 |
| 2007/0279100 A1 * | 12/2007 | Fallah et al. .................. 326/95 |

* cited by examiner

*Primary Examiner*—Daniel D Chang
(74) *Attorney, Agent, or Firm*—Dillon & Yudell LLP

(57) ABSTRACT

A circuit assembly includes a functional chip and a first capacitor. The functional chip includes a first logic island and a second logic island. The first capacitor is configured to be selectively coupled (e.g., at different times) to a first power supply terminal of the first logic island and a second power supply terminal of the second logic island.

19 Claims, 5 Drawing Sheets

US 7,667,487 B2

TECHNIQUES FOR PROVIDING SWITCHABLE DECOUPLING CAPACITORS FOR AN INTEGRATED CIRCUIT

BACKGROUND

1. Field

This disclosure relates generally to an integrated circuit and, more specifically, to techniques for providing switchable decoupling capacitors for an integrated circuit.

2. Related Art

As voltage domains (associated with logic islands (blocks)) of an integrated circuit (chip) become active with workloads, the logic islands can deplete an available local charge provided by an associated decoupling capacitor. Moreover, as chip designers migrate chip designs to more complex chip designs (e.g., single core processor designs to multi-core processor designs), a power delivery aspect of a chip design has usually become increasingly more complex. For example, in a multi-core processor design, each of the processor cores may be associated with a separate voltage domain that is managed to reduce power consumption (e.g., one or more of the cores may be powered-down during periods of inactivity while remaining ones of the cores are powered-up).

U.S. Patent Application Publication No. 2007/0138653 (hereinafter the '653 application) is directed to a power control structure for managing (to reduce leakage current and overall power dissipation) a plurality of voltage domains (each associated with a different logic island) of a functional chip. The '653 application discloses the use of a silicon carrier that supplies decoupling capacitors for the voltage domains and includes control circuitry for selectively supplying power to the voltage domains of the chip. As is disclosed, when a voltage domain is disabled, the voltage domain may be powered down to reduce overall chip power dissipation.

With reference to FIG. 1, a relevant portion of a conventional power distribution system 100 is illustrated that selectively provides power and decoupling capacitance to power supply terminals (VDD1 and VDD2) of logic islands (labeled 'Logic Island 1' and 'Logic Island 2', respectively) 104 and 106 of a functional chip 102. As is illustrated, a silicon carrier 120 includes p-channel field-effect transistors (PFETS) 106 and 108, decoupling capacitors C1 and C2, and n-channel field-effect transistors (NFETS) 110 and 112. A control circuit (not shown) provides a first control signal (CCNTL_1) to a gate of the PFET 106 and a second control signal (CCNTL_2) to a gate of the PFET 108. The first control signal, when asserted, couples the capacitor C1 to the terminal VDD1 of the logic island 104 and the second control signal, when asserted, couples the capacitor C2 to the terminal VDD2 of the logic island 106. The NFETs 110 and 112 couple a shared power supply VDD to the VDD1 and VDD2 terminals of the chip 102 responsive to control signals VCNTL_1 and VCNTL_2 (which are also provided by the control circuit), respectively. It should be noted that the capacitor C1 is dedicated to the logic island 104 and the capacitor C2 is dedicated to the logic island 106.

U.S. Pat. No. 6,967,416 (hereinafter the '416 patent) discloses selectively connecting/disconnecting decoupling capacitors (to/from a power supply terminal), such that inactive decoupling capacitors provide a uniform heat dissipation function across a chip and active decoupling capacitors provide a uniform power regulation function across the chip. According to the '416 patent, capacitors within a group are either 'enabled' to provide charge storage for an associated voltage domain, or 'disabled' from providing charge storage for the associated voltage domain (in which case the disabled capacitors function as heat sinks).

While on-die capacitance may be incorporated within a functional chip to increase local charge, incorporating on-die capacitance within a high performance functional chip is relatively expensive and may increase a chip failure rate. Moreover, while discrete decoupling capacitors may be incorporated at various packaging levels (in an attempt to improve filtering), employing discrete decoupling capacitors may create undesirable inductive loops in a power distribution system and may not provide adequate local charge.

SUMMARY

According to one aspect of the present disclosure, a circuit assembly includes a functional chip and a first capacitor. The functional chip includes a first logic island and a second logic island. The first capacitor is configured to be selectively coupled (e.g., at different times) to a first power supply terminal of the first logic island and a second power supply terminal of the second logic island.

According to another aspect of the present disclosure, a method of operating a circuit assembly includes determining workloads of a first logic island and a second logic island that are included within a functional chip. A first capacitor is selectively coupled, at different times, to a first power supply terminal of the first logic island and a second power supply terminal of the second logic island based on the workloads.

According to one embodiment of the present disclosure, a circuit assembly includes a functional chip, a first capacitor, and a second capacitor. The functional chip includes a first logic island and a second logic island. The functional chip is a multi-core processor integrated circuit chip, the first logic island includes a first processor core, and the second logic island includes a second processor core. The first capacitor is configured to be selectively coupled to a first power supply terminal of the first logic island and a second power supply terminal of the second logic island. The second capacitor is configured to be selectively coupled to the first power supply terminal of the first logic island and the second power supply terminal of the second logic island.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
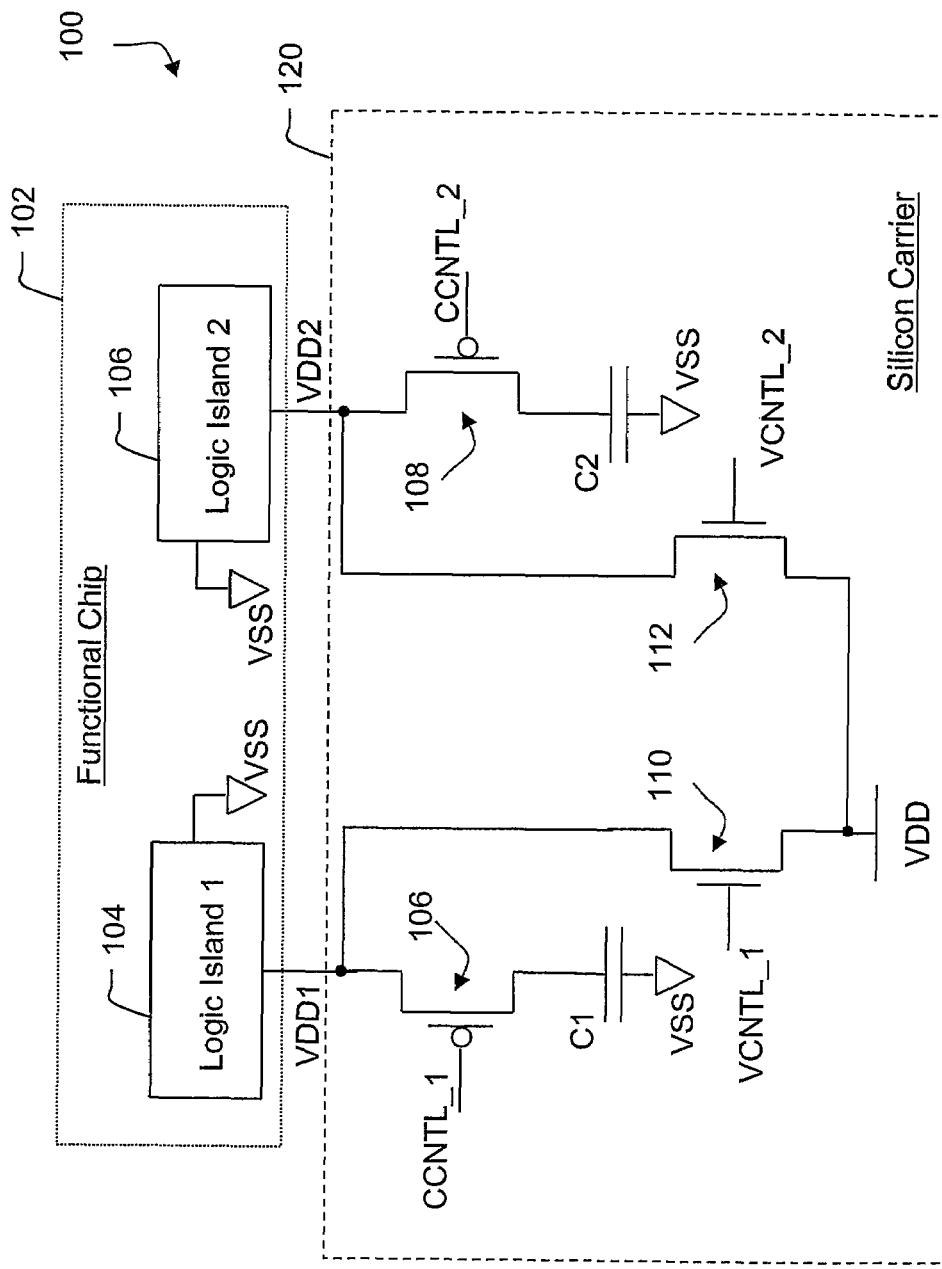
FIG. 1 is a block diagram of a relevant portion of a conventional power distribution system that includes a conventional silicon carrier that is configured to provide power to a functional chip.

As will be appreciated by one of ordinary skill in the art, the present invention may be embodied as a method, system, device, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." For example, the present invention may take the form of one or more design files included in a computer program product on a computer-usable storage medium having computer-usable program code embodied in the medium.

Any suitable computer-usable or computer-readable storage medium may be utilized. The computer-usable or computer-readable storage medium may be, for example, but is not limited to an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store a program for use by or in connection with an instruction execution system, apparatus, or device. As used herein, the term "coupled" includes both a direct electrical connection between blocks or components and an indirect electrical connection between blocks or components achieved using intervening blocks or components.

According to the present disclosure, a technique for increasing the amount of usable capacitance in relatively close proximity to logic islands of a functional chip is disclosed that can significantly improve performance of the chip without significantly increasing a cost of a circuit assembly in which the chip is incorporated. According to various aspects of the present disclosure, decoupling capacitors are configured to be deployable to multiple voltage islands. In this manner, decoupling capacitors may be moved from disabled logic islands to enabled logic islands or from less active logic islands to more active logic islands. As such, a capacitor (or capacitor bank) may be temporarily reassigned from a first voltage domain to a second voltage domain to improve the performance of a logic island associated with the second voltage domain during periods of high activity for the logic island associated with the second voltage domain. According to this aspect of the present disclosure, decoupling capacitors may be switched between voltage domains on a demand basis. The decoupling capacitors may be formed in a capacitor grid that may be electrically coupled to logic islands of an associated chip.

The grid capacitor can be, for example, incorporated in a substrate carrier that economically provides a relatively large bank of decoupling capacitor blocks for voltage domains within a chip, e.g., a multi-core processor chip. In general, decoupling capacitor blocks that are switchable between adjacent voltage domains are located adjacent or near a border between the adjacent voltage domains. For example, the decoupling capacitor blocks may be switched between voltage domains using p-channel field-effect transistors (PFETs) (that are coupled between the voltage domains and a high-side of the decoupling capacitor blocks). N-channel field-effect transistors (NFETs) may be coupled between the high-side of the decoupling capacitor blocks and ground (GND) to discharge the decoupling capacitor blocks prior to switching the decoupling capacitor blocks to a new voltage domain. In at least one configuration, each PFET has an associated NFET.

Figure 2:
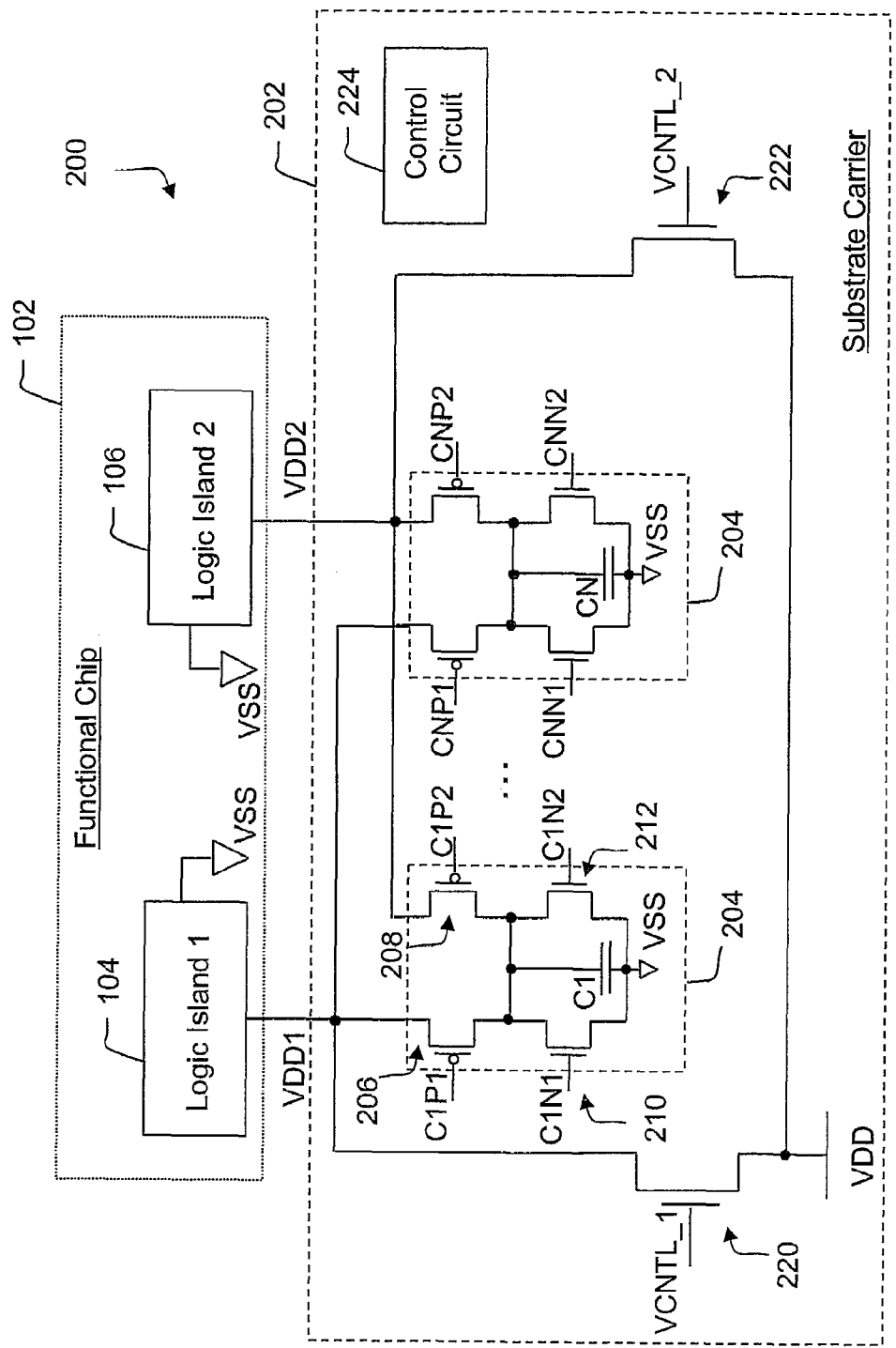
FIG. 2 is a block diagram of a relevant portion of a power distribution system that includes a substrate carrier that is configured to provide power to a functional chip, according to various embodiments of the present disclosure.

With reference to FIG. 2, a relevant portion of a power distribution system 200, configured according to one or more embodiments of the present disclosure, is illustrated that selectively provides power and decoupling capacitance to the power supply terminals (VDD1 and VDD2) of the logic islands (labeled 'Logic Island 1' and 'Logic Island 2', respectively) 104 and 106 of the functional chip 102. As is illustrated, a substrate carrier 202 includes an application appropriate number of capacitor blocks (banks) 204. Contacts of the substrate carrier 202 may be coupled to contacts of the functional chip 102 using any number of known techniques, e.g., solder balls or flip-chip balls. Each of the blocks 204 includes p-channel field-effect transistors (PFETS) 206 and 208, an associated decoupling capacitor block (e.g., a capacitor (or capacitor bank) C1), and n-channel field-effect transistors (NFETS) 210 and 212. A first control signal (e.g., control signal C1P1) is provided to a gate of the PFET 206 and a second control signal (e.g., C1P2) is provided to a gate of the PFET 208. The first control signal, when asserted, couples the associated decoupling capacitor block (e.g., the capacitor C1) to the terminal VDD1 of the logic island 104 and the second control signal, when asserted, couples the associated decoupling capacitor block (e.g., the capacitor C1) to the terminal VDD2 of the logic island 106.

The NFETs 210 and 212 are controlled by control signals (e.g., control signals C1N1 and C1N2, respectively) to selectively short the associated decoupling capacitor block (e.g., the capacitor C1) prior to switching the associated decoupling capacitor block to a different logic island. NFETs 220 and 222 are controlled by control signals (e.g., control signals VCNTL_1 and VCNTL_2, respectively) to selectively couple power supply VDD to the VDD1 and VDD2 terminals of the islands 104 and 106, respectively. It should be noted that the capacitors C1 to CN are not dedicated to either of the logic islands 104 and 106. That is, the capacitors C1 to CN may be reassigned to different logic islands based on workloads of the logic islands. While only two logic islands are depicted in FIG. 2, it should be appreciated that the techniques of the present disclosure are broadly applicable to functional chips including more than two logic islands. Moreover, the disclosed techniques may be employed with logic islands that require different voltage levels (e.g., voltages for VDD1 and VDD2 may be derived from different power supplies having different voltage levels).

According to various aspects of the present disclosure, a control circuit 224 may be employed to determine upcoming periods of increased or decreased activity associated with a voltage domain. In general, the control circuit 224 is configured to dictate the necessity of switching the decoupling capacitor blocks from/to a particular voltage domain. The control circuit 224 can be used to 'look-ahead' to predict periods of high activity in particular areas of a chip. The control circuit 224 can also be used to predict when activity is waning and capacitors can be switched from a particular voltage domain (or area). When a period of high activity is predicted, one or more capacitors may be switched to a more-loaded voltage domain to support increased switching activity. When activity slows down within a given voltage domain, one or more capacitors may be switched from the voltage domain to one or more voltage domains that are experiencing increased workloads. It should be appreciated that if the capacitance assigned to a voltage domain is increased too quickly, a sudden change of impedance may occur within a power distribution system (PDS) that may cause amplitude transients and resulting failures within an associated chip. According to at least one aspect of the present disclosure, capacitors are switched between voltage domains in a manner that minimizes adverse affects on an impedance of a power distribution system.

For example, if a voltage domain requires an additional two microfarads of capacitance, the capacitance may be switched to the voltage domain in one microfarad increments over a period of time that is selected to minimize any adverse affect of changes in the power supply impedance. In this case, a capacitor (or capacitor bank) having a one microfarad capacitance may be switched to the voltage domain at one time, and another capacitor (or capacitor bank) having a one microfarad capacitance may be switched to the voltage domain at a later time (selected to reduce transients). According to various embodiments, the control circuit 224 may be configured to dynamically manage voltage variation on particular voltage domains. The techniques of the present disclosure have a relatively broad application to chips that employ multiple domains. For example, embodiments of the present disclosure may be employed in/with chips that turn domains on and off, systems that employ silicon carrier technology with multiple domains, and chips that employ multiple logic islands (e.g., processor cores) with the same voltage level, but different voltage domains. In general, chips that employ the same voltage level, allow for switching more capacitors at a time. It should be appreciated that the disclosed techniques are not limited to silicon carrier applications or to multi-core applications.

While two power supply terminals are illustrated in FIG. 2, more than two power supply terminals may be employed. As noted above, control signals on the PFETs 206 and 208 select a power rail to which a capacitor is connected, and control signals on the NFETs 210 and 212 are used to discharge a capacitor during an in-situ run-time switch from one power rail to another power rail. When a first logic island is disabled, the capacitors associated with the first logic island can be reconfigured to add capacitance to a second logic island and, in this manner, potentially improve the performance of the second logic island. Broadly, the capacitance may be viewed as a capacitance bank, irrespective of which voltage domain is using the capacitance bank (or a portion thereof). Overlap of one VDD mesh plane with another VDD mesh plane may be readily achieved with back-end-of-line chip wiring. For example, a stack of eight metal layers may be employed when three separate voltage domains exist and a decoupling capacitance grid (including multiple decoupling capacitor blocks) is employed. To facilitate connection between reconfigured decoupling capacitor blocks, voltage domains may be distributed below logic islands of a functional chip.

It should be noted that when a voltage difference between VDD1 and VDD2 is greater than a PFET reverse bias voltage of the employed technology, a designer should generally ensure (through layout or circuit design techniques) that current is not drawn from one power supply to another. Techniques are known in the field of mixed voltage input/output (I/O) that may be readily applied. For example, n-type well scattering may be employed. Moreover, it may be advisable for a designer to cross-couple the C1P1 and C1P2 nodes such that even when a voltage domain is shut-down, a gate of the PFET connected to the powered down voltage domain is still held at a high enough potential to minimize leakage current flow from one voltage domain to another voltage domain.

The control circuit 224 may employ a feedback mechanism that provides information before or after diagnostic tests of voltage domain variation to allow for a real-time optimization. In this case, the control circuit 224 may be configured to monitor voltage domain variation. The control circuit 224 may, for example, include a design target for variations in the voltage domain that the control circuit 224 attempts to achieve by switching in and out available decoupling capacitor banks (books).

A number of different techniques may be employed to determine which capacitors to switch and how to switch them. For example, a control circuit may employ a first cross-reference table that facilitates assignment of decoupling capacitance blocks to any of the various voltage islands, with a priority given to each voltage domain. The control circuit may be configured to assign the decoupling capacitor blocks to the active logic with the highest priority. Decoupling capacitor blocks near the VDD3 logic island may be assigned a first priority to VDD3, a second priority to VDD2, and a third priority to VDD1. Decoupling capacitor blocks near the VDD1 logic island may be assigned a first priority to VDD2, a second priority to VDD1, and a third priority to VDD3. A second cross-reference table may be generated that provides a transition order to each decoupling capacitor block (e.g., block A, block B, and block C). The transition order may be assigned randomly or with optimizing algorithms. For example, the control circuit may be configured to switch all the A blocks first, then the B blocks, and then the C blocks.

Figures 3, 4:
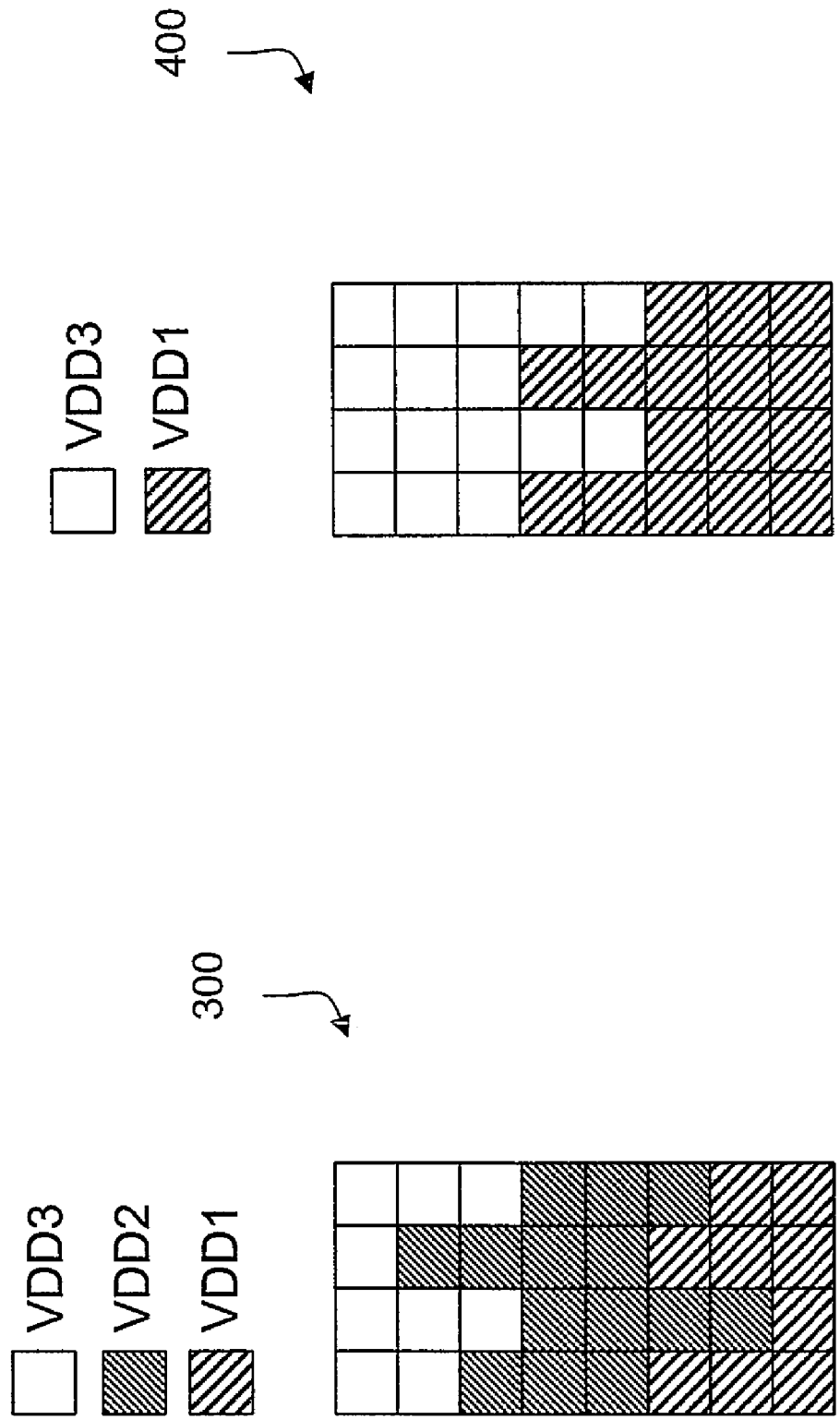
FIG. 3 is a diagram of a grid capacitor (e.g., incorporated in a substrate carrier) that includes a number of decoupling capacitor blocks that are assigned to various voltage domains based on workloads of the voltage domains, according to one embodiment of the present disclosure.
FIG. 4 is a diagram of the grid capacitor of FIG. 3 with at least some of decoupling capacitor blocks being reassigned to different voltage domains based on workloads of the voltage domains, according to another embodiment of the present disclosure.

With reference to FIG. 3, a diagram 300 for an example first assignment of thirty-two decoupling capacitor blocks, which are configured to supply decoupling capacitance to voltage domains (VDD1, VDD2 and VDD3) of three logic islands in a functional chip, is illustrated. With reference to FIG. 4, a diagram 400 for an example second assignment of the thirty-two decoupling capacitor blocks is illustrated. When the control circuit 224 determines that power to the logic island connected to VDD2 is to be disabled, the decoupling capacitor blocks assigned to VDD2 may be reassigned to provide additional capacitance for the VDD1 and VDD3 voltage domains, as shown. In a typical implementation, no more than three voltage domains would be employed in any particular area of a chip due to the fact that the effectiveness of the decoupling capacitors are generally limited by proximity to a logic island. However, in certain applications, more than three voltage domains may be implemented within a given area. In this case, congestion can generally be avoided when routing voltage domains. When a logic island is disabled, the transition of the decoupling capacitor blocks from the disabled voltage domain to a reassigned voltage domain may be managed in a number of different manners.

Figure 5:
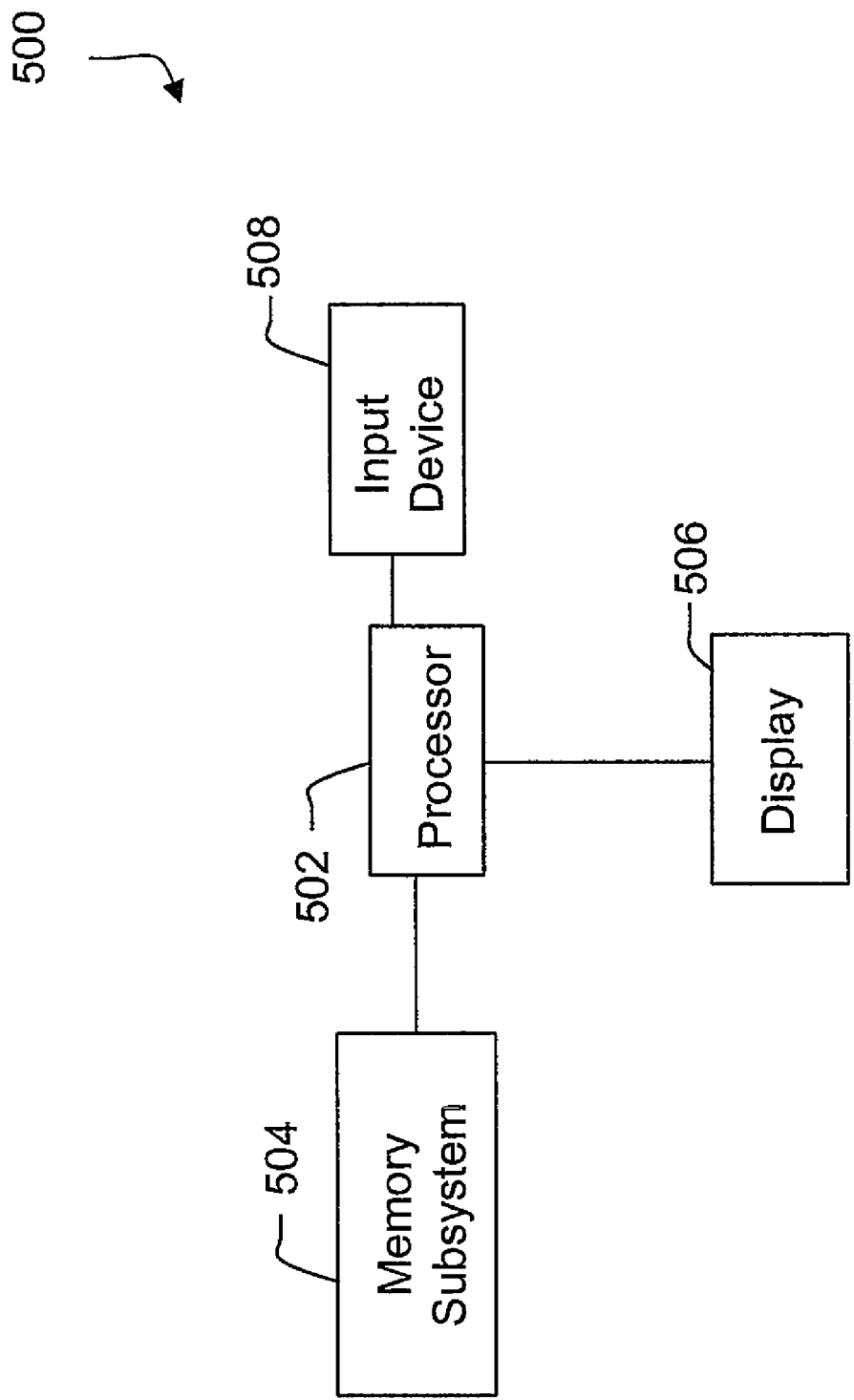
FIG. 5 is a block diagram of an example computer system that may be configured to include a power distribution system configured according to the present disclosure.

With reference to FIG. 5, an example computer system 500 is illustrated that may include one or more circuits that employ one or more circuit assemblies configured according to various embodiments of the present disclosure. The computer system 500 includes a processor 502 that is coupled to a memory subsystem 504, a display 506, and an input device 508. The processor 502 may include one or more circuit assemblies configured according to the present disclosure. The memory subsystem 504 normally includes an application appropriate amount of volatile memory (e.g., dynamic random access memory (DRAM)) and non-volatile memory (e.g., read-only memory (ROM)). The display 506 may be, for example, a cathode ray tube (CRT) or a liquid crystal display (LCD). The input device 508 may include, for example, a mouse and a keyboard. The processor 502 may also be coupled to one or more mass storage devices, e.g., a compact disc read-only memory (CD-ROM) drive.

Figure 6:
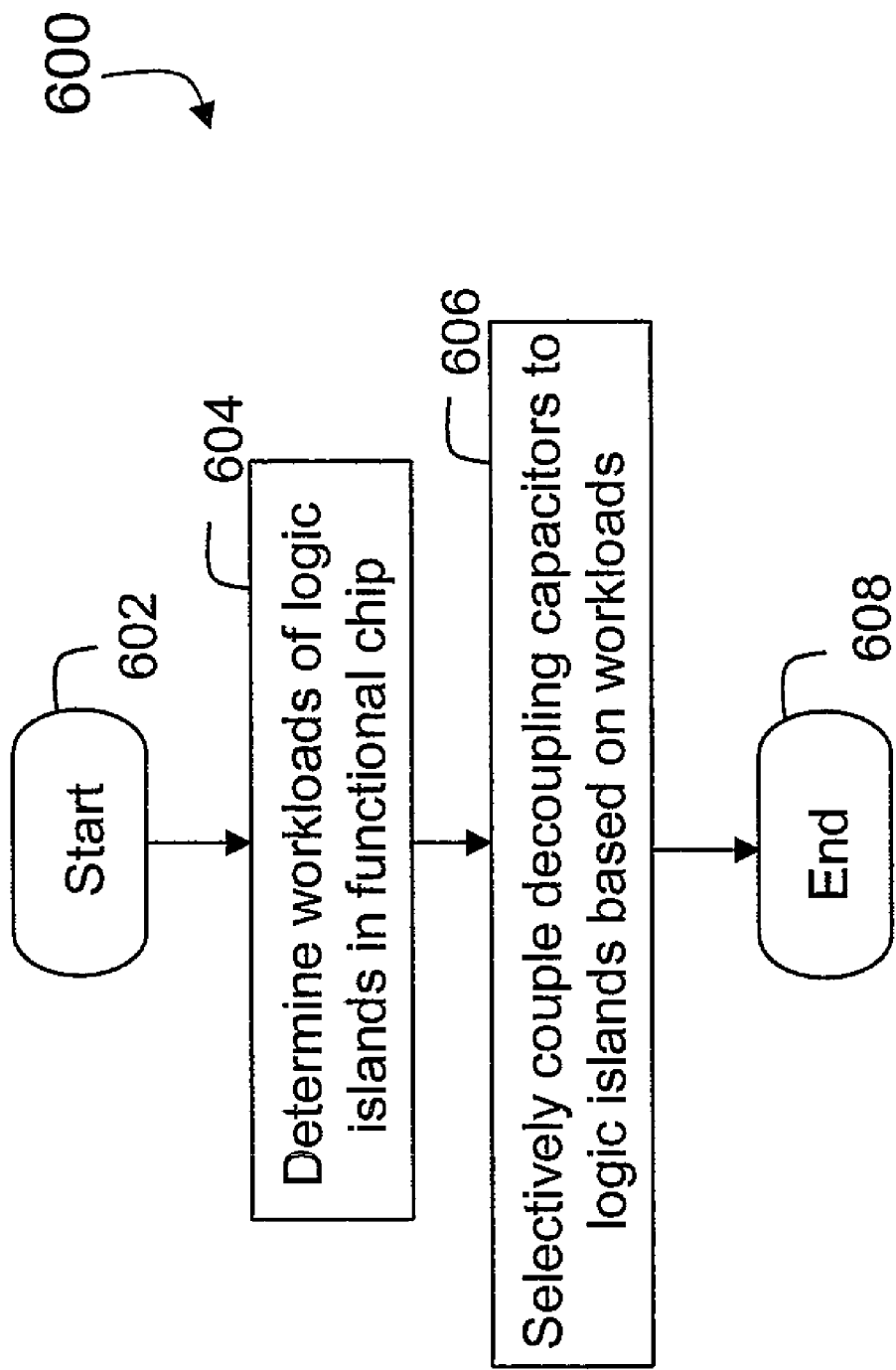
FIG. 6 is a flowchart of a process for operating a circuit assembly according to an embodiment of the present disclosure.

With reference to FIG. 6, an example process 600 for operating a circuit assembly, according to an embodiment of the present disclosure, is illustrated. In block 602, the process 600 is initiated at which point control transfers to block 604. In block 604, workloads of logic islands in a function chip are determined. The workloads may be determined in a number of manners. For example, the control circuit 224 may be configured to monitor a change in power supply voltages for each logic islands. As another example, the control circuit 224 may poll an operating system (OS) to retrieve workload assignments for the logic islands. Next, in block 606, decoupling capacitors are selectively coupled to the logic islands based on the workloads. As noted above, decoupling capacitors assigned to one logic island may be reassigned to another logic island based on the workloads of the logic islands. Following block 606, control transfers to block 608, where the process 600 terminates and returns to a calling process until the process 600 is initiated again.

Accordingly, techniques have been disclosed herein that generally increase the amount of usable capacitance in relatively close proximity to logic islands of a functional chip. Increasing the amount of usable capacitance to the logic islands of a chip can significantly improve performance of the chip without significantly increasing a cost of a circuit assembly in which the chip is incorporated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A circuit assembly, comprising:
a functional chip including a first logic island and a second logic island;
a first capacitor configured to be selectively coupled to a first power supply terminal of the first logic island and a second power supply terminal of the second logic island; and
a control circuit configured to determine workloads for the first and second logic islands, wherein the control circuit is further configured to provide one or more control signals that cause the first capacitor to be coupled to the first logic island or the second logic island based on the workloads.

2. The circuit assembly of claim 1, where the first capacitor is incorporated within a substrate carrier and is configured to be selectively coupled to the first and second power supply terminals at different times.

3. The circuit assembly of claim 1, further comprising:
a second capacitor configured to be selectively coupled, at different times, to the first power supply terminal of the first logic island and the second power supply terminal of the second logic island.

4. The circuit assembly of claim 3, wherein the first and second capacitors are incorporated within a substrate carrier.

5. The circuit assembly of claim 4, wherein the substrate carrier is a silicon carrier.

6. The circuit assembly of claim 1, wherein the first capacitor is included within a capacitor grid including multiple capacitors that are configured to be selectively coupled, at different times, to the first logic island and the second logic island.

7. The circuit assembly of claim 1, wherein the functional chip is a multi-core processor integrated circuit chip, and wherein the first logic island includes a first processor core and the second logic island includes a second processor core.

8. A method of operating a circuit assembly, comprising:
determining workloads of a first logic island and a second logic island that are included within a functional chip; and
selectively coupling, at different times, a first capacitor to a first power supply terminal of the first logic island and a second power supply terminal of the second logic island based on the workloads.

9. The method of claim 8, wherein the first capacitor is incorporated within a substrate carrier.

10. The method of claim 8, further comprising:
selectively coupling, at different times, a second capacitor to the first power supply terminal of the first logic island and the second power supply terminal of the second logic island based on the workloads.

11. The method of claim 10, wherein the first and second capacitors are incorporated within a substrate carrier.

12. The method of claim 11, wherein the substrate carrier is a silicon carrier.

13. The method of claim 8, wherein the first capacitor is included within a capacitor grid including multiple capacitors that are each configured to be selectively coupled, at different times, to the first logic island and the second logic island.

14. The method of claim 8, wherein the functional chip is a multi-core processor integrated circuit chip, and wherein the first logic island includes a first processor core and the second logic island includes a second processor core.

15. A circuit assembly, comprising:
a functional chip including a first logic island and a second logic island wherein the functional chip is a multi-core processor integrated circuit chip, and wherein the first logic island includes a first processor core and the second logic island includes a second processor core;
a first capacitor configured to be selectively coupled to a first power supply terminal of the first logic island and a second power supply terminal of the second logic island; and
a second capacitor configured to be selectively coupled to the first power supply terminal of the first logic island and the second power supply terminal of the second logic island.

16. The circuit assembly of claim 15, wherein the first and second capacitors are incorporated within a substrate carrier.

17. The circuit assembly of claim 16, wherein the substrate carrier is a silicon carrier.

18. The circuit assembly of claim 17, wherein the first and second capacitors are included within a capacitor grid including multiple capacitors that are configured to be selectively coupled, at different times, to the first logic island and the second logic island.

19. The circuit assembly of claim 15, further comprising:
a third capacitor configured to be selectively coupled to the first power supply terminal of the first logic island and the second power supply terminal of the second logic island.

* * * * *